United States Patent [19]
Lee et al.

[11] Patent Number: 5,905,782
[45] Date of Patent: May 18, 1999

[54] FACSIMILE JACK FOR SELECTIVELY ROUTING TRANSMISSIONS THROUGH A FACSIMILE NETWORK

[75] Inventors: Warren S. Lee, Jacksonville, Fla.; David W. Copp, Jacksonville, Fla.; Dale T. Platteter, Pittsford, N.Y.; Neil P. Carrier, Jacksonville, Fla.; Ran Wellingstein, Jacksonville, Fla.; Noam Kedem, Jacksonville, Fla.; James E. Carter, Jacksonville, Fla.

[73] Assignee: NKO, Inc., Jacksonville, Fla.

[21] Appl. No.: 08/649,209

[22] Filed: May 17, 1996

[51] Int. Cl.⁶ .................................................. H04M 11/00
[52] U.S. Cl. ............................. 379/100.01; 379/100.12; 358/400
[58] Field of Search ...................... 358/400, 407, 358/434, 435, 436, 437, 438, 439, 440, 468; 379/90.01, 93.01, 93.05, 93.07, 93.14, 100.01, 100.02, 100.09, 100.12, 100.14, 100.17

[56] References Cited

U.S. PATENT DOCUMENTS

| | | | |
|---|---|---|---|
| 4,058,838 | 11/1977 | Crager et al. | 358/257 |
| 4,381,427 | 4/1983 | Cheal et al. | 370/216 |
| 4,741,021 | 4/1988 | Kotani et al. | 379/100 |
| 4,746,986 | 5/1988 | Tanigawa | 358/256 |
| 4,905,273 | 2/1990 | Gordon et al. | 379/93.01 |
| 4,920,560 | 4/1990 | Kageyama | 379/100.14 |
| 4,961,185 | 10/1990 | Sawada | 370/79 |
| 4,964,154 | 10/1990 | Shimotono | 379/100 |

(List continued on next page.)

OTHER PUBLICATIONS

CCITT X.5: Data Communication Networks: Services and Facilities, Interfaces—Facsimile Packet Assembly/Disassembly Facility (FPAD) in a Public Data Network, Geneva, 1992.

CCITT X.39: Data Communication Networks: Services and Facilities, Interfaces —Procedures for the Exchange of Control Information and User Data Between a Facsimile Packet Assembly/Disassembly (FPAD) Facility and packet Mode Data Terminal Equipment (DTE) or Another FPAD, Geneva 1992.

ITU–T X.29: Public Data Networks: Interfaces —Procedures for the Exchange of Control Information and User Data Between a Packet Assembly/Disassembly (PAD) Facility and a Packet Mode DTE or Another Pad, Mar. 1993.

*Primary Examiner*—Curtis A. Kuntz
*Assistant Examiner*—Melur Ramakrishnaiah
*Attorney, Agent, or Firm*—Foley & Lardner

[57] ABSTRACT

A facsimile jack selectively routes a facsimile transmission over a packet switched digital network including a source point of presence (source POP) which is local to a facsimile machine sending the facsimile transmission and a destination point of presence (destination POP) which is local to a facsimile machine receiving the facsimile transmission. The facsimile jack is connected between a facsimile machine and a telephone jack and includes a processor which determines if a destination number of the facsimile transmission is serviced by the facsimile network. If the destination number is long distance and is serviced by the facsimile network, the processor instructs a local number of the source POP to be dialed and the facsimile transmission to be sent through the source POP. If not, then other network route paths can be dialed (WATS, VPN, etc.). If a connection with other networks cannot be established either, then it dials the original number and connects the transmitting channel of the facsimile machine to the phone line. Even if the number is serviced by the network, a connection with the source POP may not be established an alternative routing paths selected if: the source POP is not operational and does not answer the incoming call; the source POP is saturated and cannot accept any additional incoming calls; the destination POP is saturated and cannot service any additional traffic; the destination POP is not operational; or the source POP or the facsimile network cannot respond with the proper initiation/training command sequence within a prescribed time-out period.

17 Claims, 12 Drawing Sheets

U.S. PATENT DOCUMENTS

| | | | |
|---|---|---|---|
| 4,964,159 | 10/1990 | Son | 379/356 |
| 4,974,097 | 11/1990 | Kaneko et al. | 358/400 |
| 4,999,836 | 3/1991 | Fujiwara | 370/110.1 |
| 5,031,218 | 7/1991 | Galard et al. | 381/46 |
| 5,033,078 | 7/1991 | Andoh | 379/100 |
| 5,034,948 | 7/1991 | Mizutani et al. | 370/79 |
| 5,050,005 | 9/1991 | Kagami | 358/434 |
| 5,065,427 | 11/1991 | Godbole | 379/100 |
| 5,113,396 | 5/1992 | Kagami | 370/110.2 |
| 5,134,611 | 7/1992 | Steinka et al. | 370/79 |
| 5,134,653 | 7/1992 | Satomi et al. | 379/355 |
| 5,142,568 | 8/1992 | Ogata et al. | 379/100 |
| 5,170,428 | 12/1992 | Watanabe et al. | 379/94 |
| 5,187,591 | 2/1993 | Guy et al. | 358/425 |
| 5,189,525 | 2/1993 | Kotani | 358/407 |
| 5,189,696 | 2/1993 | Yoshida | 379/355 |
| 5,204,895 | 4/1993 | Yoshiura | 379/100 |
| 5,216,517 | 6/1993 | Kinoshita et al. | 358/400 |
| 5,216,519 | 6/1993 | Daggett et al. | 358/434 |
| 5,216,705 | 6/1993 | Yoshida et al. | 379/100 |
| 5,228,128 | 7/1993 | Kim | 395/275 |
| 5,235,595 | 8/1993 | O'Dowd | 370/94.1 |
| 5,241,589 | 8/1993 | Jefferson | 379/355 |
| 5,260,991 | 11/1993 | Ikegaya | 379/100 |
| 5,267,307 | 11/1993 | Izumi et al. | 379/354 |
| 5,272,749 | 12/1993 | Masek | 379/216 |
| 5,278,665 | 1/1994 | Sawada et al. | 358/442 |
| 5,280,516 | 1/1994 | Jang | 379/57 |
| 5,282,202 | 1/1994 | Bernstein et al. | 370/94.1 |
| 5,282,238 | 1/1994 | Berland | 379/58 |
| 5,287,202 | 2/1994 | Kumarappan | 358/440 |
| 5,289,533 | 2/1994 | Wasio et al. | 379/100 |
| 5,289,536 | 2/1994 | Hokari | 379/221 |
| 5,291,302 | 3/1994 | Gordon et al. | 358/400 |
| 5,295,244 | 3/1994 | Dev et al. | 395/161 |
| 5,299,257 | 3/1994 | Fuller et al. | 379/100 |
| 5,305,372 | 4/1994 | Tomiyori | 379/59 |
| 5,315,649 | 5/1994 | Foster et al. | 379/355 |
| 5,323,398 | 6/1994 | Wake et al. | 370/110 |
| 5,329,580 | 7/1994 | Yoshino | 379/90 |
| 5,337,349 | 8/1994 | Furohashi et al. | 379/100 |
| 5,339,174 | 8/1994 | Harris | 358/442 |
| 5,347,516 | 9/1994 | Yoshida | 370/94.1 |
| 5,381,240 | 1/1995 | Murayama | 358/436 |
| 5,408,520 | 4/1995 | Clark et al. | 379/93.07 |
| 5,410,416 | 4/1995 | Amberg et al. | 358/405 |
| 5,426,692 | 6/1995 | Fujise | 379/93 |
| 5,444,707 | 8/1995 | Cema et al. | 370/94.1 |
| 5,490,199 | 2/1996 | Fuller et al. | 379/1 |
| 5,546,388 | 8/1996 | Lin | 370/60 |
| 5,638,428 | 6/1997 | Berku et al. | 379/100.06 |

FIG. 11

| STATUS | LED3 | LED2 | LED1 |
|---|---|---|---|
| OK | OFF | OFF | OFF |
| HARDWARE ERROR | OFF | OFF | ON |
| E$^2$ROM CHECKSUM ERROR | OFF | ON | OFF |
| SOFTLOAD SOFTWARE CHECKSUM ERROR | OFF | ON | ON |
| RESERVED | ON | OFF | OFF |
| RESERVED | ON | OFF | ON |
| LOCAL CONTROL MODE | ON | ON | OFF |
| NOT SET-UP | ON | ON | ON |

FACSIMILE JACK FOR SELECTIVELY ROUTING TRANSMISSIONS THROUGH A FACSIMILE NETWORK

RELATED APPLICATIONS

This application is related to applications entitled "APPARATUS AND METHOD FOR TRANSMITTING FACSIMILE DATA," Ser. No. 08/649,237; "METHOD OF ROUTING A DATA TRANSMISSION," Ser. No. 08/649,208; "METHOD OF MONITORING A DATA TRANSMISSION," Ser. No. 08/649,202; "POINT OF PRESENCE (POP) FOR DIGITAL FACSIMILE NETWORK," Ser. No. 08/649,571; "POINT OF PRESENCE (POP) FOR DIGITAL FACSIMILE NETWORK WITH VIRTUAL POPS USED TO COMMUNICATE WITH OTHER NETWORKS," Ser. No. 08/649,572, "POINT OF PRESENCE (POP) FOR DIGITAL FACSIMILE NETWORK WITH SPOOFING CAPABILITY TO MAINTAIN FAX SESSION," Ser. No. 08/649,239, all of which are filed concurrently with this application and are incorporated by reference herein.

BACKGROUND OF THE INVENTION

1. Field of the Invention

The invention relates to a facsimile hardware device and more particularly to a facsimile jack, connected between a facsimile machine and a telephone line interface, which is capable of controlling a transmission route of a facsimile transmitted from the facsimile machine.

2. Description of the Related Art

Conventionally, facsimile data transmissions are conducted entirely through voice grade, analog telephone lines. A typical facsimile transmission route is shown in FIG. 1 A source facsimile machine 10 dials a phone number of a destination facsimile machine 12. The call is routed through a telephone jack 20 to a local exchange carrier at a central office (LEC CO) 30. Subsequently, a connection is made from the LEC CO 30 to a local interexchange carrier's point of presence (IXC POP) 40. The local IXC POP 40 makes a connection through a long distance carrier facility 50 to a destination IXC POP 42 which in turn makes a connection to a destination LEC CO 32. The destination LEC CO 32 then calls the phone number of the destination facsimile machine 12. Once the destination facsimile machine 12 answers, an end-to-end connection is established between the two facsimile machines 10, 12. The appropriate facsimile session setup is then performed by the two facsimile machines 10, 12, and this is followed by the facsimile data transmissions. Upon completion of the facsimile data transmissions, the facsimile machines hang up and the connection is terminated In the conventional system illustrated in FIG. 1, when one facsimile machine dials another, a circuit-like connection is created between the two machines Data is transmitted between the machines in real-time. In other words, there is little delay from when the source facsimile machine 10 sends data to when the destination facsimile machine 12 receives the data.

Further in the conventional system, telecommunications services (phone lines, etc.) used for facsimile transmissions, and their associated cost structure, are formally defined by the carrier in a document called a tariff. Tariffs are filed for approval by state regulatory commissions and/or the Federal Communication Commission (FCC).

There are also store and forward services available for transmitted facsimiles. With store and forward, a facsimile is generally transmitted to a local vendor with information about the final destination. The local vendor then takes responsibility for delivering the facsimile. Such services are not real-time in that there is no circuit-like connection between the source and destination facsimile machines. In such systems, the facsimile transmission is usually sent at a later time when the rates are less. A disadvantage of such systems is that in the event a facsimile cannot be delivered to the destination facsimile machine, there may be no reliable way of notifying the user of the source facsimile machine that the facsimile has not been delivered. Important facsimile transmissions requiring immediate delivery and confirmation of receipt generally cannot be sent through such systems.

Another conventional way of reducing costs of data transmission including, for example, facsimile data, voice data, and modem data, is to use alternate communication services, such as a dedicated telephone lines such as a Wide Area Telephone Service (WATS) line or a Virtual Private Network (VPN) line. Alternatively, telephone companies offer a variety of overlapping discount schedules which could be utilized to minimize costs for a particular transmission. A disadvantage of using such alternate communication services is that a user has to be aware of a multitude of telephone number, access codes, and rate schedules.

Auto-dialers may also be used to reroute calls to a voice carrier based on broad categories, long distance, intra-lata, etc. They are however unselective in that, if a call is long distance, it is routed regardless of the destination. Also, these devices do not reroute if the original target is busy or unavailable. Lastly, these device do not exchange information up to or down from the facility to which they connect nor do they exchange signalling or other forms of communication.

Moreover, facsimile transmissions today are accomplished through the use of analog grade circuits. While almost all telephone systems have upgraded their backbone and main transport facilities from an analog to a digital infrastructure, the primary interface to the customer/end user is still an analog line. The telephone companies perform an analog to digital and then digital to analog conversion to merge these two transport mediums. Facsimile transmissions start out, internally to the facsimile device, as digital data which is then modulated and overlayed with a protocol for transport over an analog medium. In theory it is possible for an analog line to carry 56 Kbps of information. In order to support an end to end circuit mode connection, the digital infrastructure must allocate or make available this much bandwidth. When the analog facsimile transmission is demodulated and the protocol removed, a maximum data transfer rate of 28.8 Kbps can be supported. Usually, the transmission requires only 9.6 Kbps or less of bandwidth. As a consequence, when a facsimile is sent over a voice grade circuit through the network's digital transmission facilities, most of the bandwidth is not utilized even though it is being paid for.

An example of a digital network, access to which is still made through voice grade lines, is shown in FIG. 2, and corresponds to a system recommended in a document published by The International Telegraph and Telephone Consultative Committee (CCITT). In the CCITT system, data is transmitted digitally between a source facsimile packet assembly/disassembly facility (FPAD) 44 and a destination FPAD 46 through a Packet Switched Public Data Network (PSPDN) 51. The access to either FPAD 44 or 46 is still made through its respective General Switched Telephone Network (GSTN) 31 or 33. The CCITT system has some technical characteristics, however, which make it unattractive, particularly for facsimile transmissions. They are:

1. It runs on X.25 protocol which significantly increases the length of call.

2. It does not guarantee delivery of data.

3. It has a variable delay in delivery of communicated packets.

4. It does not accommodate switched analog access lines.

SUMMARY OF THE INVENTION

An object of the invention is to provide a device for routing facsimile transmissions over a digital facsimile network in a cost-efficient manner.

Another object of the invention is to provide a facsimile jack, connectable between a conventional facsimile machine and a telephone jack, which routes facsimile transmissions through several possible routes based on cost, capacity, utilization, and status of those routes.

Still another object of the invention is to provide a method of routing facsimile transmissions over the digital facsimile network through the facsimile jack.

The above and other objects are accomplished by a facsimile jack for selectively routing a facsimile transmission over a facsimile network. The facsimile jack is connected between a facsimile machine and a telephone jack and includes a processor which determines if a destination number of the facsimile transmission is serviced by the facsimile network.

The facsimile network is a packet switched digital network having a source point of presence which is local to the transmitting facsimile machine and a destination point of presence which is local to the receiving facsimile machine. If the destination number is long distance and is serviced by the facsimile network, the processor instructs the local number of the source point of presence to be dialed and the facsimile transmission to be sent through the source point of presence (SmartPOP™). If the destination number is a local number or is not serviced by the facsimile network, the processor instructs the facsimile transmission to be sent through other paths: examples being WATS Service, VPN Service, other SmartPOP™'s, or conventional voice long distance.

The above and other objects are accomplished by a facsimile jack for selectively routing a facsimile transmission over a facsimile network. The facsimile jack is connected between a facsimile machine and a telephone jack and includes a processor which selects the routing path which is to be used in the transmission. The processor first determines if the destination number of the facsimile transmission is serviced by the facsimile network. If note the processor chooses one of several alternative routing paths.

The processor may choose an alternative routing path for the following additional reasons: the local point of presence is not operational and does not answer the incoming call; the local point of presence is saturated and cannot accept any additional incoming calls; the destination point of presence is saturated and cannot service any additional traffic; the destination point of presence is not operational; or the local point of presence or the facsimile network cannot respond with the proper initiation/training command sequence within a prescribed time-out period.

The facsimile network is a packet switched digital network having a source point of presence which is local to the transmitting facsimile machine and a destination point of presence which is local to the receiving facsimile machine. If the destination number is long distance and is serviced by the facsimile network, the processor instructs a local number of the source point of presence to be dialed and the facsimile transmission to be sent through the source point of presence. If the destination number is a local number or is not serviced by the facsimile network, the processor instructs the facsimile transmission to be sent through conventional means.

In order to accomplish the above, the facsimile jack is additionally equipped with a subscriber line interface circuit interfaced with the facsimile machine and a direct access arrangement interfaced with the telephone jack. When the facsimile machine goes off hook, the interface circuit converts loop currents sent from the facsimile machine into a first set of transmit and receive signals. The processor converts the first set of transmit and receive signals into a second set and the direct access arrangement converts the second set of transmit and receive signals into loop currents which is sent to the telephone jack to take the telephone line off hook.

The facsimile jack further includes a dual tone multifrequency transceiver which is connected to the interface circuit and which receives dialing tones associated with the destination number from the facsimile machine through the interface circuit. The transceiver converts the dialing tones into hexadecimal form, and provides the dialing tones in hexadecimal form to the processor.

Additional objects and advantages of the invention will be set forth in the description which follows. The objects and advantages of the invention may be realized and obtained by means of instrumentalities and combinations particularly pointed out in the appended claims.

BRIEF DESCRIPTION OF THE DRAWINGS

The invention is described in detail herein with reference to the drawings in which:

FIG. 11 is a tabulation of the error status designations corresponding to diagnostic indicators implemented on the facsimile jack according to the invention.

DETAILED DESCRIPTION OF THE PREFERRED EMBODIMENTS

Figure 1:
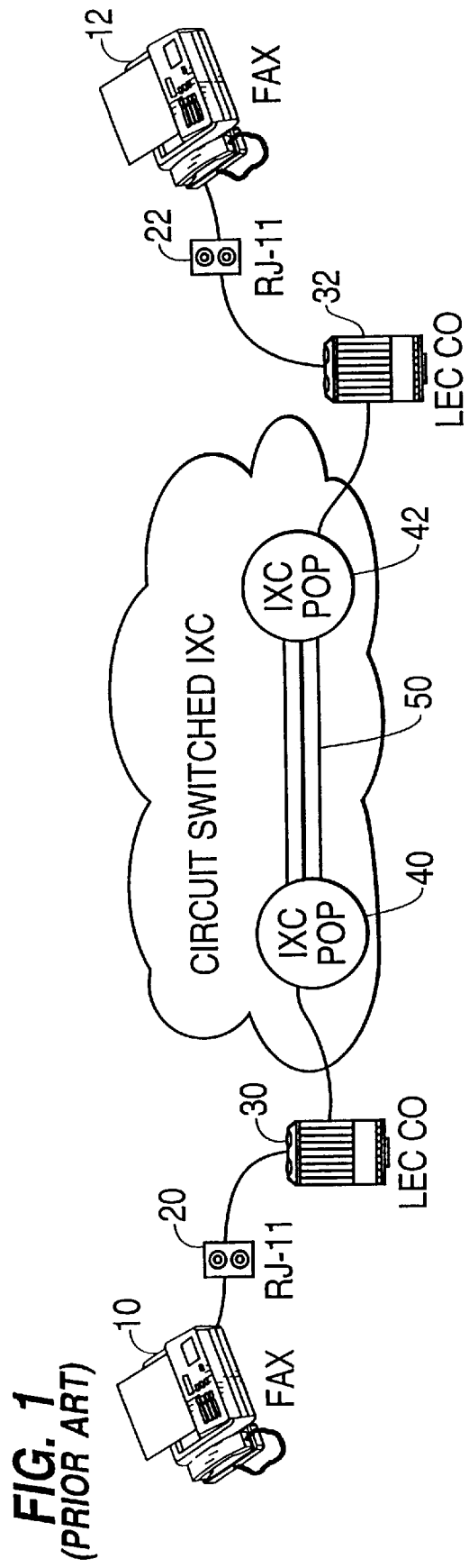
FIG. 1 is a schematic illustration of a conventional facsimile transmission system.
Figure 2:
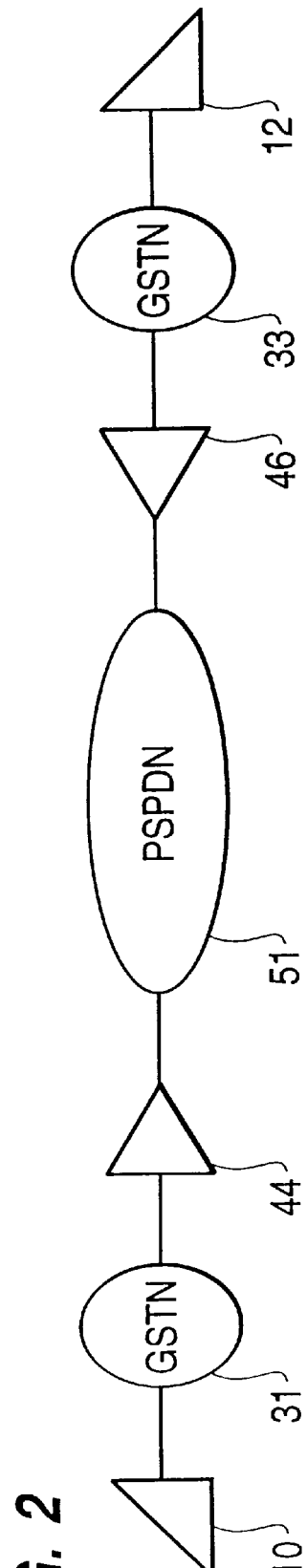
FIG. 2 is a schematic illustration of a digital facsimile transmission system.
Figure 3:
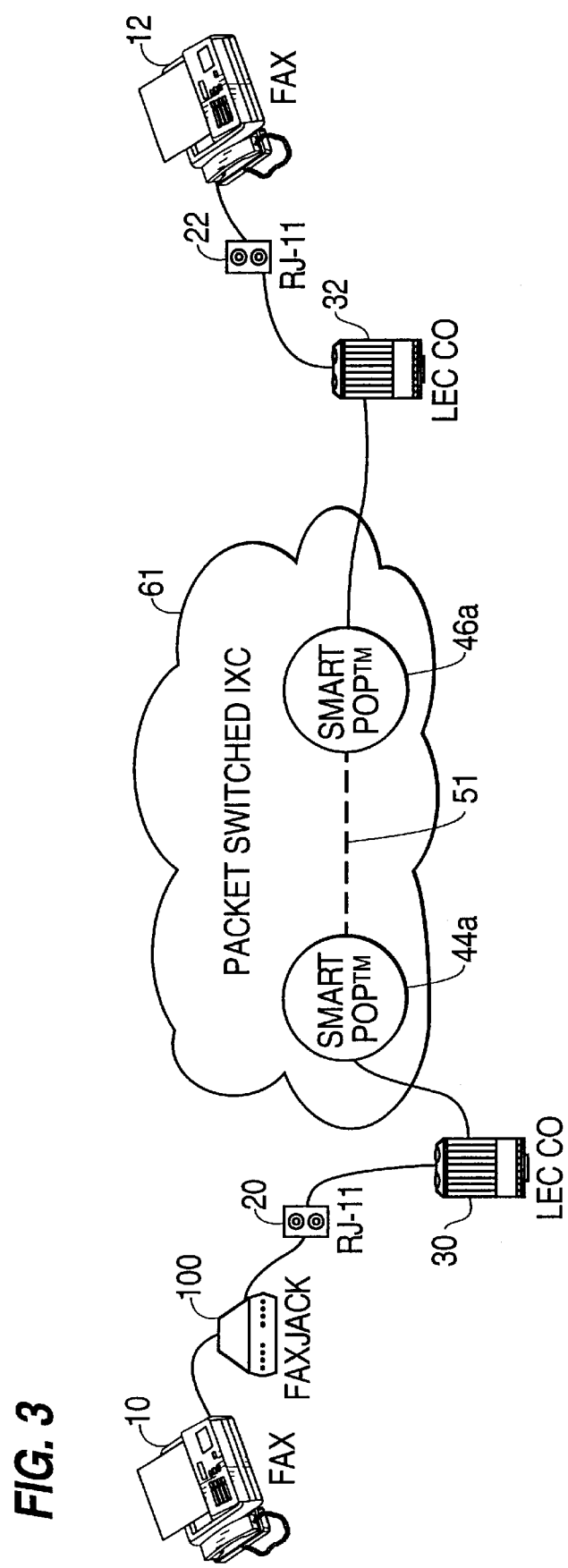
FIG. 3 is a schematic illustration of a digital facsimile transmission system having a facsimile jack according to the invention.
Figure 4:
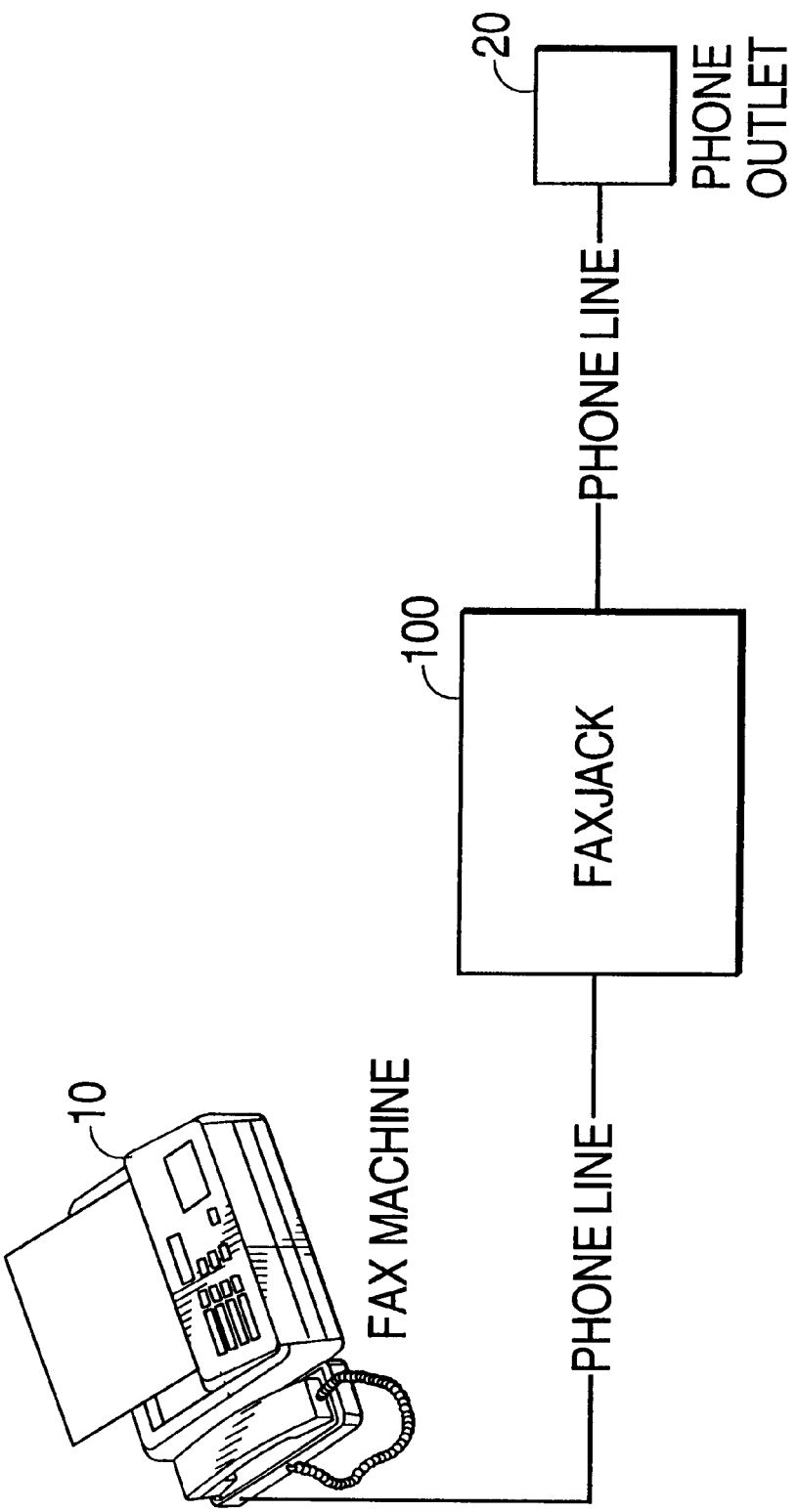
FIG. 4 is an enlarged schematic illustration of the facsimile jack according to the invention connected between a facsimile machine and a telephone outlet.

FIG. 3 is a schematic illustrations of a digital facsimile transmission system having a facsimile jack according to the invention (hereinafter "the FaxJack™"). FIG. 4 is an enlarged schematic illustration of the FaxJack™ connected between a facsimile machine 10 and a telephone jack 20.

In the system according to the invention, instead of the data being transmitted through voice grade lines, it is communicated using packet switched digital facilities 51. The data is transmitted digitally between a source Smart-POP™ 44a and a destination SmartPOP™ 46a. This is accomplished by selectively routing the user's long distance calls before they are directed to their long distance carrier. To allow such selective routing, the FaxJack™ 100 according to the invention is provided between the facsimile machine 10 and the telephone jack 20.

Analog lines are still used to communicate from the source facsimile machine 10 to the source SmartPOP™ 44a and from the destination SmartPOP™ 46a and the destination facsimile machine 12. By using digital communications between the two SmartPOP™'s 44a and 46a, the cost of transmitting facsimile data is significantly reduced.

In FIG. 3, the connection 51 between the two SmartPOP™'s may be a copper wire link, a fiber optic link, a satellite link, or a microwave link. In other; words, the connection 51 represents a virtual connections from one SmartPOP™ to another.

The FaxJack™ 100 redirects calls from the source facsimile's normal long distance carrier to the packet switched digital network of FIG. 3. A principal purpose of the FaxJack™ 100 is to redirect calls made by the facsimile machine 10 and transmit them over the packet switched digital network. Redirection of calls is transparent to the user. In other words, facsimile transmissions are initiated and received the same way after the FaxJack™ 100 is installed as it was before it was installed.

The FaxJack™ 100 decides on a call by call basis whether a call should be directed through the packet switched digital network or through another network. In order to do this, the FaxJack™ 100 keeps track of telephone numbers which are serviceable by the packet switched digital network. For example, for domestic U.S. long distance calls, if the sets—(301, 622), (301, 384), (410, 276)—are stored in a network directory of the FaxJack™ 100 as being serviceable by the network, calls which have the prefixes—301-622-xxxx, 301-384-xxxx, and 410-276-xxxx—will be redirected by the FaxJack™ 100.

International calls are monitored in a similar manner. For international calls, a country code is stored in the FaxJack™ 100 in addition to a national significant number (analogous to area code) and a city code (analogous to exchange). For example, if the set (82, 415, 962) is stored in the network directory as being serviceable by the network, calls which have the prefix 82-415-962-xxxx will be redirected by the FaxJack™ 100.

A key feature of the upload download process is that it can be performed incrementally over several transactions during the setup period of each transaction.

The FaxJack™ 100 also provides additional functions which are transparent to the user, such as collecting certain statistical data on all incoming and outgoing facsimile sessions. Additionally, the data and the software in the FaxJack™ 100 can be updated remotely. This allows for software updates and additional features to be added over time. The FaxJack™ 100 also allows for downloading of network directories and uploading of statistical information retained in the resident memory, of the FaxJack™ 100.

The redirection of facsimile transmissions is performed by the FaxJack™ 100 in the following manners A user at the facsimile machine 10 places documents to be faxed into the facsimile machine 10 and keys in the phone number of the destination facsimile machine 12. The facsimile machine 10 then goes off-hook to gain control of the phone line. The FaxJack™ 100 detects the off-hook condition, takes the phone line off-hook, and connects the receive channel of the phone line with the source facsimile machine 10. The facsimile machine 10 detects the dial tone and initiates dialing. The transmission channel from the facsimile machine is not electrically connected to the transmission channel of the telephone line. It is connected to the interface circuit of the FaxJack™ 100. The digital access arrangement of the FaxJack™ 100 is connected to the transmission channel of the telephone line. The digits which are dialed are not transmitted directly to the LEC CO 30, but instead, they are intercepted by the FaxJack™ 100. The FaxJack™ 100 then determines if the number being dialed is serviced by the network based on the set of numbers stored in the resident memory of the FaxJack™ 100. If it is not, other network route paths can be dialed (WATS, VPN, etc.); if this all fail or cannot be connected, then, it dials the original number and connects the, transmitting channel of the source facsimile machine to the phone line. If the number is serviced by the network, the FaxJack™ 100 dials the local number of the source SmartPOP™ 44a.

The FaxJack™ 100 may choose an alternative routing path for other reasons. They are:

1. The local SmartPOP™ 44a is not operational and does not answer the incoming call.

2. The local SmartPOP™ 44a is saturated and cannot accept any additional incoming calls.

3. The destination SmartPOP™ 46a is saturated and cannot service any additional traffic.

4. The destination SmartPOP™ 46a is not operational.

5. The SmartPOP™ 44a or the facsimile network cannot respond with the proper initiation/training command sequence within a prescribed time-out period.

Once connected to the source SmartPOP™ 44a, the FaxJack™ 100 communicates setup information such as serial number of the FaxJack™ 100 and the destination phone number. At this point, the FaxJack™ 100 and the SmartPOP™ 44a are in communication with each other and can communicate additional data if necessary. Examples would be receive statistics stored in the facsimile jack 100 or routing tables updates needed by the FaxJack™ 100. After the source SmartPOP™ 44a has verified that the FaxJack™ 100 is registered, it connects to a, destination SmartPOP™ 46a which is servicing a facsimile machine corresponding to the destination phone number. The number being dialed is passed to the destination SmartPOP™ 46a which in turn dials the destination facsimile number. After connecting and communicating initial facsimile machine setup parameters, the destination SmartPOP™ 46a notifies the source SmartPOP™ 44a that it has made a successful connection with the destination facsimile machine 12. At this point, the FaxJack™ 100 connects the transmit signal of the facsimile machine 10 to the outside phone line and the facsimile machine 10 begins to transmit data. The data from the facsimile machine 10 is received as analog signals by the source SmartPOP™ 44a and then digitized and transmitted as packets to the destination SmartPOP™ 46a. The digitized packets are received and recombined by the destination SmartPOP™ 46a and converted back to analog signals. These analog signals are then sent to the destination facsimile machine 12. Information communicated between the destination facsimile machine 12 and the source facsimile machine 10 is also carried out in the same manner.

It is understood that it is possible for machines which have the capability to transmit facsimile data without the use of facsimile machines, e.g., computers equipped with facsimile emulation software, the functional equivalent of the FaxJack™ 100 could be implemented, for example, as in software. Likewise, hardware facsimile jacks can also be used with this type of equipment.

Figure 5:
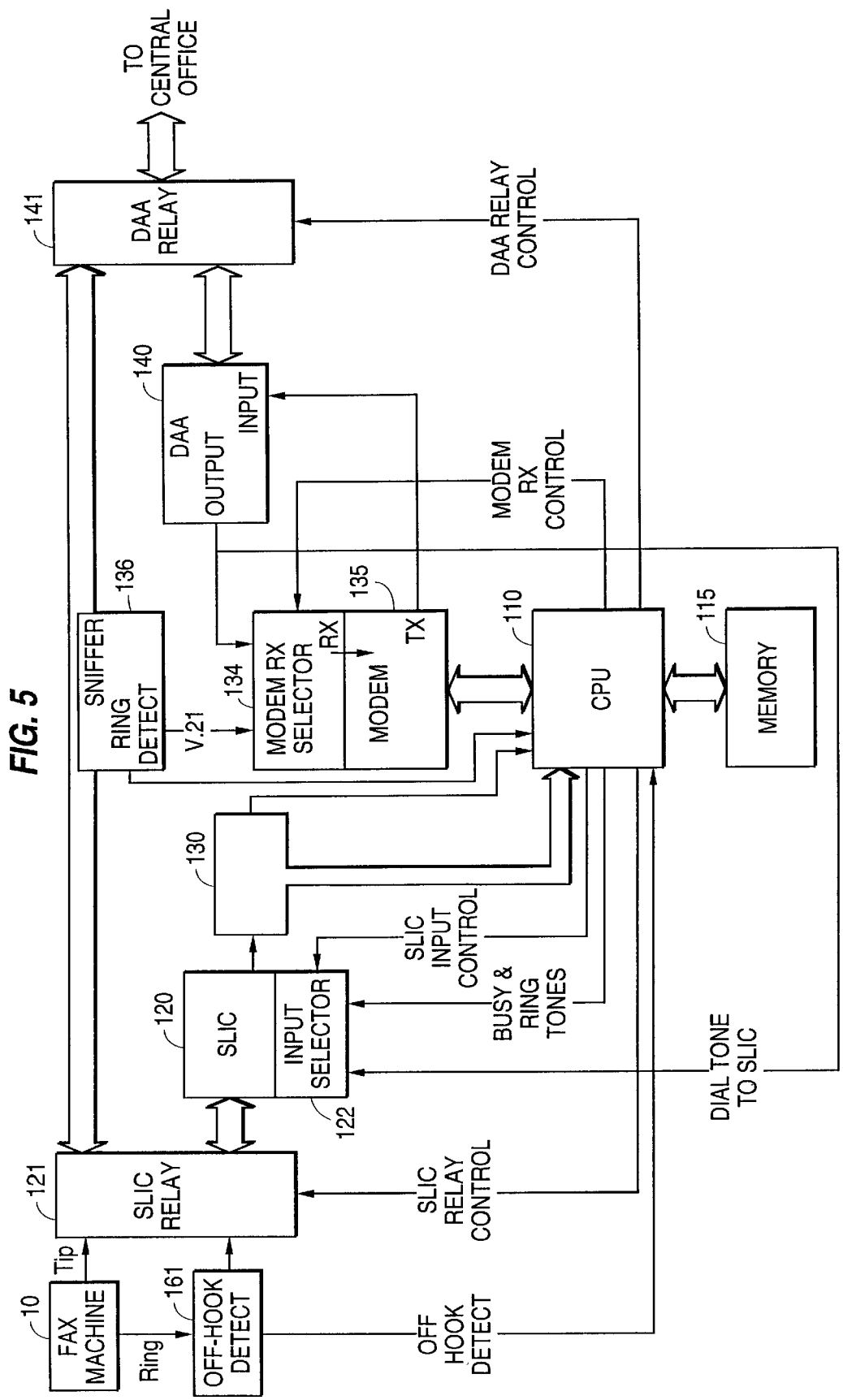
FIG. 5 is a block diagram of the internal components of the facsimile jack according to the invention.

FIG. 5 illustrates the hardware components of the FaxJack™ 100. The central processing unit (CPU) 110 is the master of the system and controls the other components and makes decisions about which numbers are to be called, i.e., the local SmartPOP™ number or the long distance number. The CPU 110 is also responsible for accepting updates to the network directory, for maintaining statistical data, and for communicating the statistical data back to the SmartPOP™.

The subscriber line interface circuit (SLIC) 120 is interfaced to the attached facsimile machine 10 through a SLIC relay 121. The SLIC 120 converts loop currents received from the attached facsimile machine 10 into transmit and receive signals. In addition, busy and ring tones are transmitted to the attached facsimile machine 10 through the SLIC 120 at the command of the CPU 110.

In the preferred embodiment, a dual tone multifrequency transceiver (DTHF) is used to detect the tones used for dialing by the attached facsimile machine 10. The DTMF detects dual frequency tones and converts them to a hexadecimal number so they can be interpreted and manipulated by the CPU 110. Alternatively, a digital signal processor (DSP), which performs digital signal filtering, may be used to accomplish the same function as the DTHF. The DTMF or the DSP is denoted by reference numeral 130 in FIG. 5.

A non-volatile memory (NVM) 115 is used to store the FaxJack™ 100 network directory as well as statistical and setup data. The NVM 115 is initialized and updated by the CPU 110. The NVM 115 is sized to hold the largest possible network directory as well as statistical and setup data. Without data compression of the network directory a preferred approximate size is 90 KB. The NVM 115 preferably maintains data integrity for extended periods of unpowered operation, e.g., at least 90 days, and allows for several hundred write operations per day.

Other hardware components of the FaxJack™ 100 are as follows. A direct access arrangement (DAA) 140 is interfaced to the telephone company through a DAA relay 141 and is responsible for taking the transmit and receive signals and converting them to loop currents. A modem 135 is used to generate DTMF tones for dialing by the CPU 110 and is also used to communicate between the CPU 110 and the SmartPOP™. An off-hook detector 161 indicates to the CPU 110 when an off-hook condition is requested by the attached facsimile machine 10.

The basic operations of the components of the FaxJack™ 100 are described next. When the facsimile machine 10 gets ready to make a call to a destination facsimile machine 12, it takes the phone off-hook to initiate the call. The off-hook detector 161 notifies the CPU 110 of the off-hook request. The CPU 110 then issues an off-hook signal to the DAA relay 141 which takes the phone line off-hook to the local telephone company. A dial tone is emitted from the phone company and is passed through the DAA relay 141, to the SLIC relay 121, and then to the attached facsimile machine 10.

Once the dial tone is received by the attached facsimile machine 10, the dialing is initiated. The dialed number is decoded by the DTHF/DSP 130 and read by the CPU 110. At this point, the dialing sequence is not yet transmitted to the phone company. The CPU 110 must first make a determination as to whether or not the prefixes of the dialed number correspond to a prefix stored in the network directory. The CPU 110 makes this determination upon completion of the dialing by the facsimile machine 10. If the prefix of the number dialed does not correspond to a prefix stored in the network directory, the CPU 110 dials the number the facsimile machine 10 requested by using the modem 135 and routes the transmit line of the SLIC relay 121 directly to the DAA relay 141. If it is a long distance call and the prefix is serviced by the packet switched digital network, the FaxJack™ 100 dials the source SmartPOP™ 44a via a local numbers. Once connected to the source SmartPOP™ 44a, the FaxJack™ 100 transmits thereto the phone number being requested by the facsimile machine 10, along with other information, and upon request from the source SmartPOP™ 44a, connects the transmit signal of the SLIC relay 121 directly to the DAA relay 141 allowing the facsimile machine 10 to communicate directly with the SmartPOP™ 44a.

At the completion of the facsimile transmission, the facsimile machine 10 initiates a hang-up sequence by placing the line on-hook This is indicated to the CPU 110 by the off-hook signal transition The CPU 110 then places the phone line on-hook by removing the off-hook signal to the DAA relay 141.

In the event that no power is supplied to the FaxJack™ 100 hardware, the FaxJack™ 100 allows the attached facsimile machine 10 to operate as if the FaxJack™ 100 was not connected. This is facilitated through the use of the SLIC and DAA relays 121 and 141 arranged between the telephone line coming into the FaxJack™ 100 to the telephone line exiting the FaxJack™ 100. The SLIC and DAA relays 121 and 141 are normally closed, so during power-off conditions, the relay allows a direct connection between the attached facsimile machine and the telephone line interface and during power-on conditions, the SLIC and DAA relays 121 and 141 allow other operations through the FaxJack™ 100.

A sniffer 136 performs the "snooping" function, which is related to keeping track of the number of pages which is transmitted The sniffer 136 also detects incoming calls. Upon detection of an incoming call, the CPU 110 is so informed by the sniffer 136 and the CPU 110 issues a ring command to the attached facsimile machine 10 through the SLIC 120. When the attached facsimile machine 10 goes off-hook, the CPU 110 is notified and connects the SLIC relay 121 directly to the DAA relay 141. Thereafter, the CPU 110 instructs the DAA relay 141 to go off-hook to answer the incoming call and thereby couple the attached facsimile machine 10 directly to the incoming facsimile request as if the FaxJack™ 100 was not connected. If the attached facsimile machine 10 does not respond to the ring request of the incoming call, the FaxJack™ 100 does not answer the incoming ring at the DAA relay 141.

Figure 6:
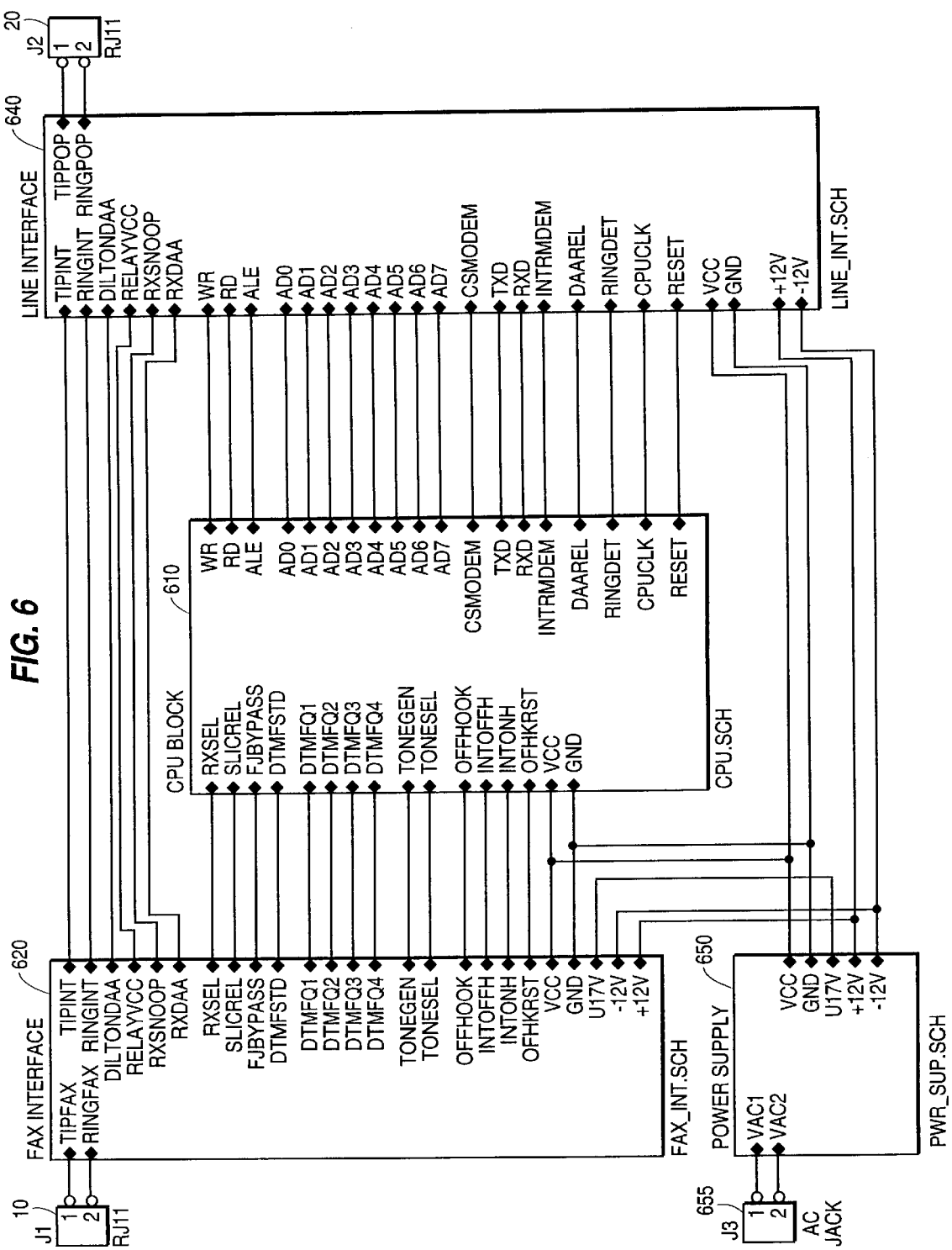
FIG. 6 is a block diagram which illustrates the connections between the component blocks of the facsimile jack according to the invention.

FIG. 6 is a block diagram which illustrates the connections between the component blocks of the FaxJack™ 100 according to the invention. Each of the block elements of FIG. 6 corresponds to one or more elements shown in FIG. 5, except for the power supply 650. The power supply 650 is not shown in FIG. 5, but is understood to supply power to the elements of FIG. 5 as illustrated in FIG. 6.

Figure 7:
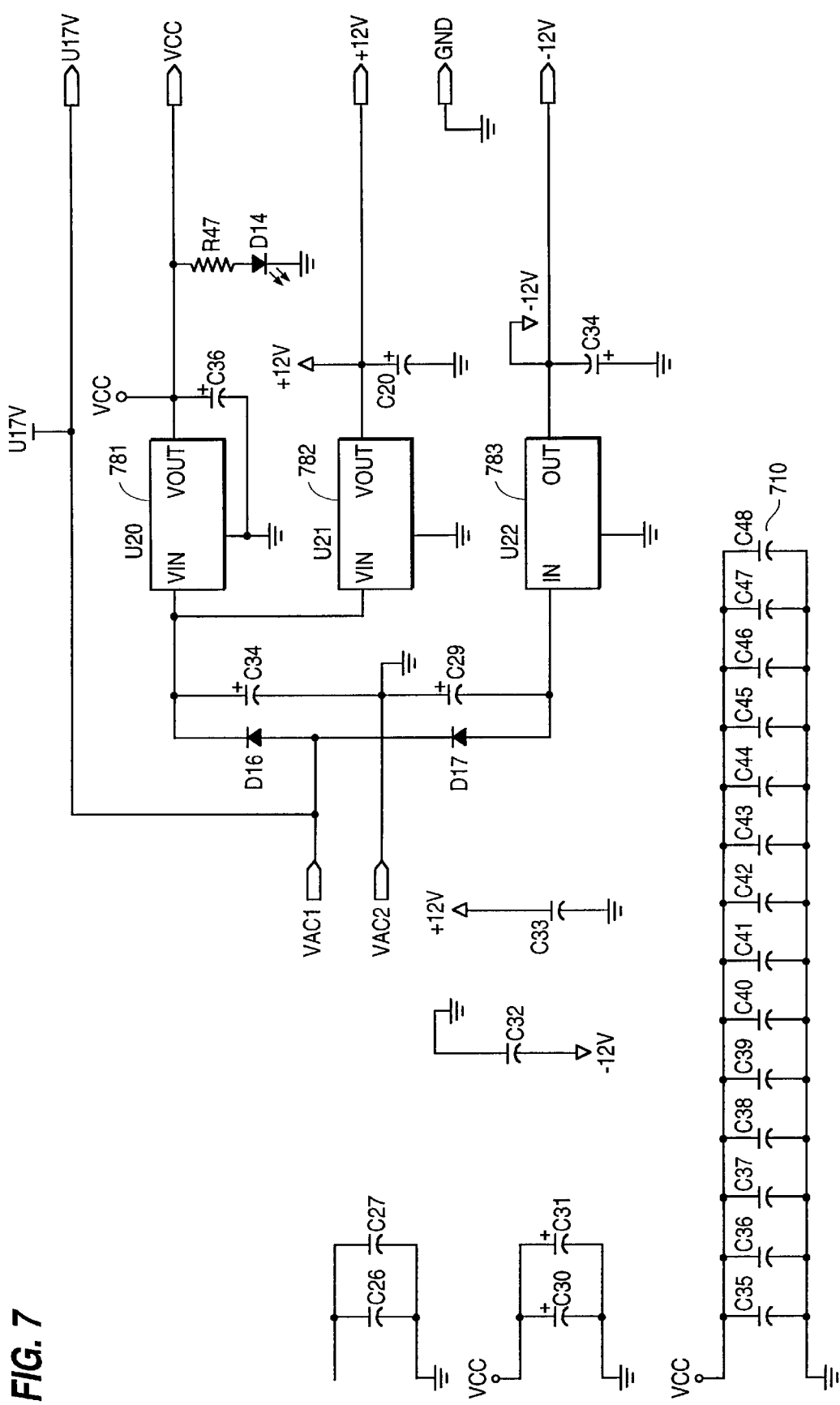
FIG. 7 is a schematic diagram of the power supply module of the facsimile jack according to the invention.

The power supply 650 supplies DC power to the CPU block 610, the fax interface 620, and the line interface 640. The power supply module 650 plugs into a transformer-type power adaptor which plugs into an AC wall socket 655. The power adapter is preferably about 12 volts AC. The schematic details of the power supply module 650 are illustrated in FIG. 7.

The power supply module 650 includes three voltage regulators 781, 782 and 783. All three are standard components and could be made by either National Semiconductor or Panasonic or other manufacturer The power supply module 650 also has a plurality of capacitors 710 provided in parallel. The capacitors 710 provide capacitive isolation for the purpose of reducing the noise on the line.

Figure 8A:
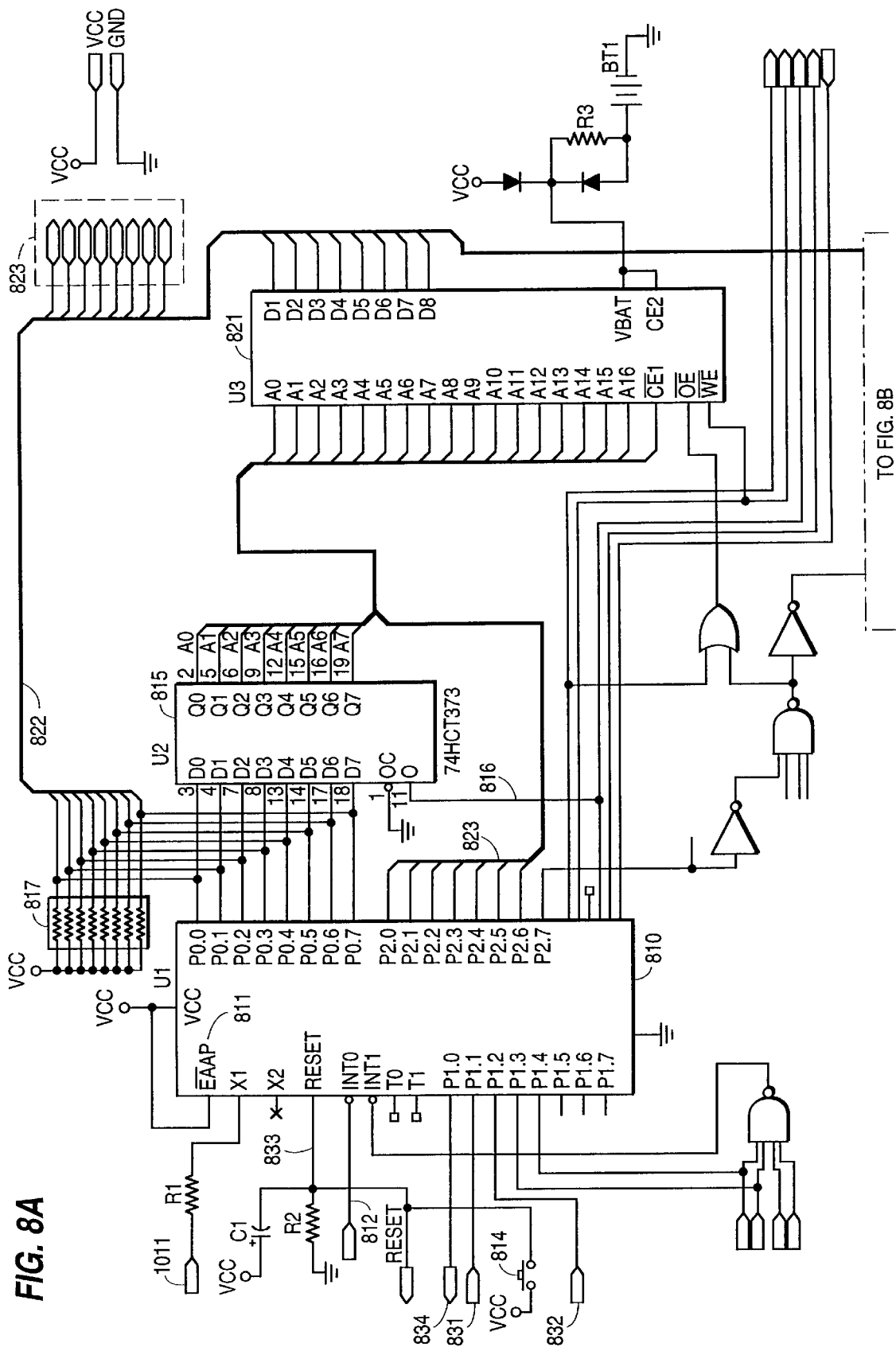
FIG. 8 is a schematic diagram of the CPU interface block of the facsimile jack according to the invention.
Figure 8B:
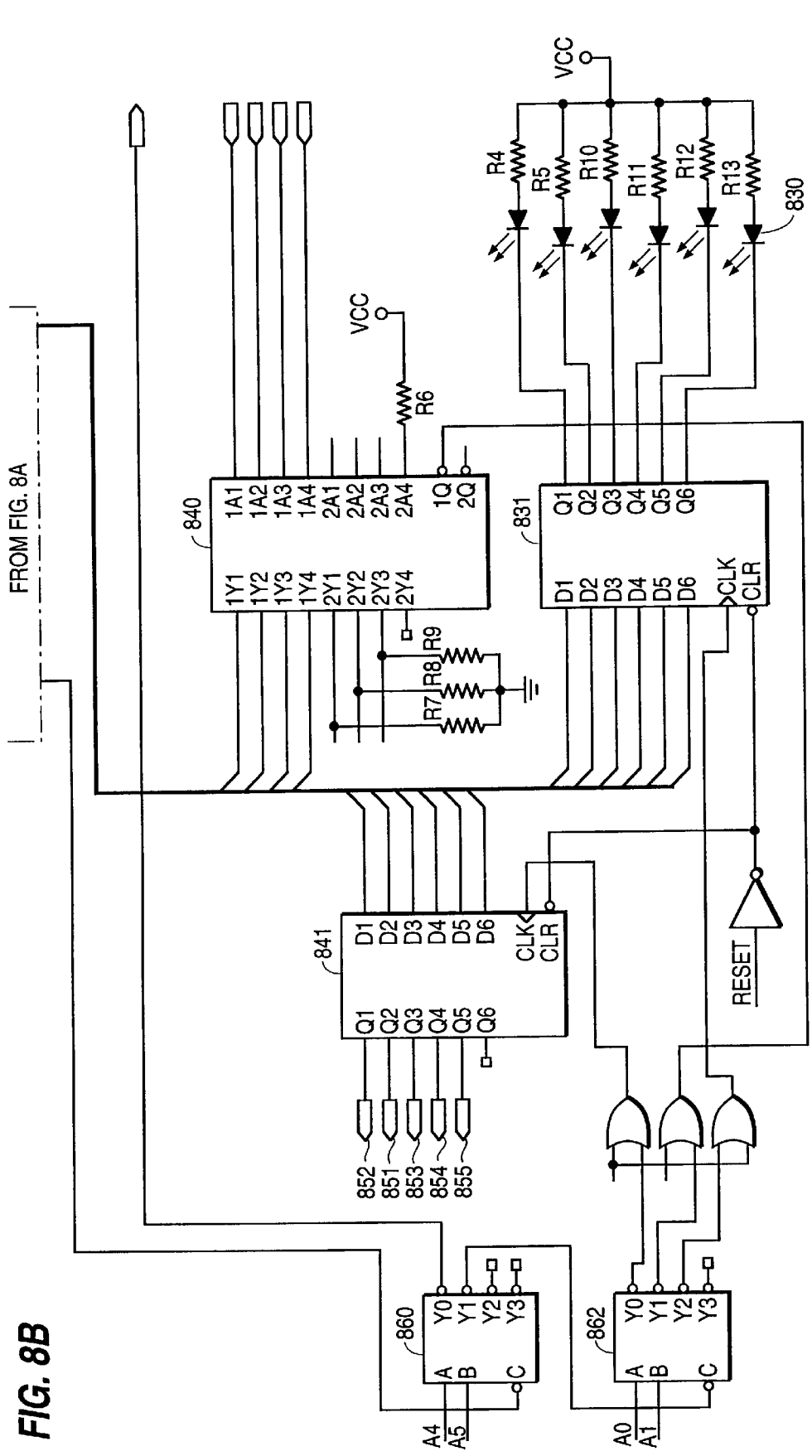

The CPU block 610 comprises the CPU 110 of FIG. 5 which includes a processor 810. The schematic details of the CPU block 610 are illustrated in FIG. 8. In the preferred embodiment, the processor 810 is a Philips S-87C51FB processor. As part of the processor 810 an electrically-programmable read-only memory (EPROM) is provided internally in the processor 810 to hold the boot code of the FaxJack™ 100. The boot code is initialized onto the internal EPROM and provides the processor 810 minimal functionality to perform self-test functions and control certain hardware components of the FaxJack™ 100. The boot code also provides minimal control of each hardware component so as to facilitate a communication path for downloading additional control software. In an alternative embodiment, the processor 810 is a Philips 80C51 and an electrically-programmable read-only memory (EPROM) is provided externally to the processor 810.

Figure 10:
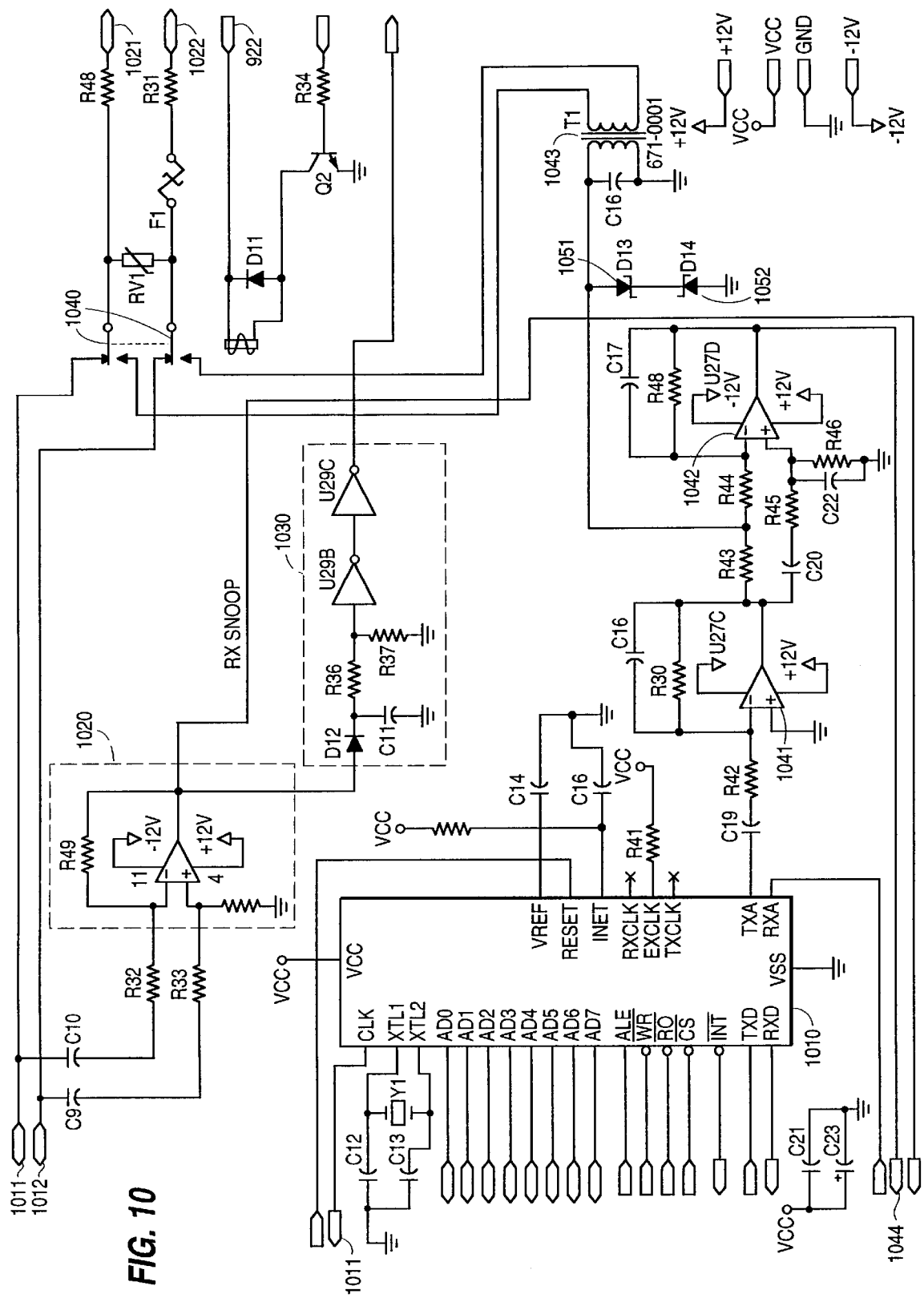
FIG. 10 is a schematic diagram of the telephone line interface block of the facsimile jack according to the invention.

The clock for the processor 810 is driven by a clock output 1011 of the modem 135 (see FIG. 10). The clock speed of the modem is 11.0592 Mhz. The modem also supplies an interrupt signal through line 812.

A brief description of other control signals are provided below. First, an off-hook signal (OFFHOOK) 831 is supplied from the off-hook detect 161 to indicate when the attached facsimile 10 goes off hook. Second, a bypass signal 832 is supplied from the telephone line interface block 640. The bypass signal 832 indicates to the processor 810 that the FaxJack™ 100 is being bypassed. Third, a reset signal (RESET) 833 is supplied to the processor 810. The reset signal 833 is controlled by a switch 814. The reset signal 833 is supplied to both the processor 810 and the modem 135. Fourth, the processor 810 generates a tone generator signal (TONEGEN) 834 and supplies it to the SLIC 120. The tone generator signal 834 instructs the SLIC 120 whether or not to generate a tone.

The processor 810 has an internal EPROM. The pin location for the internal EPROM is indicated as 811. A single external random access memory (RAM) 821 is provided as a storage unit for the processor 810. The size of RM 821 is 128k×8. An address latch 815 is provided to control the flow of low order address information between the processor 810 and the RAM 821. An address latch enable (ALE) line 816 from the processor 810 clocks the address latch 815. Signal lines 823 (A8–A14) represent the high order address information.

Lines 822 carry either the lower order address lines or data between the processor 810 and the RAM 821. Data may also be supplied and transmitted to and from an external location 823. A pull-up 817 consists of a pack of resistors and maintains lines 822 in a high-impedance state when they are not driving data.

Lines 822 are also connected to an LED latch 831, a DTMF latch 840, and an output latch 841. The LED latch 831 controls output to a plurality of LED's 830, which are used to display diagnostic information about the FaxJack™ 100. The diagnostic information is discussed below with reference to FIG. 11.

The DTHF latch 840 receives dial tones which have been decoded by the DTMF transceiver 130 and supplies them to the lines 822. The output latch 841 receives commands from the processor 810 through lines 822 and transmits control signals to the SLIC relay (SLICREL 851), the DAA relay (DAAREL 852), modem Rx selector (RXSEL 853), the SLIC input selector (TONESEL 854), and the interrupt circuit 970 of the fax interface block (OFHKRST 855).

Demultiplexers 860 and 862 provide chip select enable signals for the LED latch 831, the DTMF latch 840, the output latch 841, and modem 135.

The fax interface block 620 includes the SLIC 120, the SLIC relay 121, the input selector 122, the DTMF/DSP 130, and the off-hook detect 161. The schematic details of the fax interface block 620 are illustrated in FIG. 9.

Figure 9:
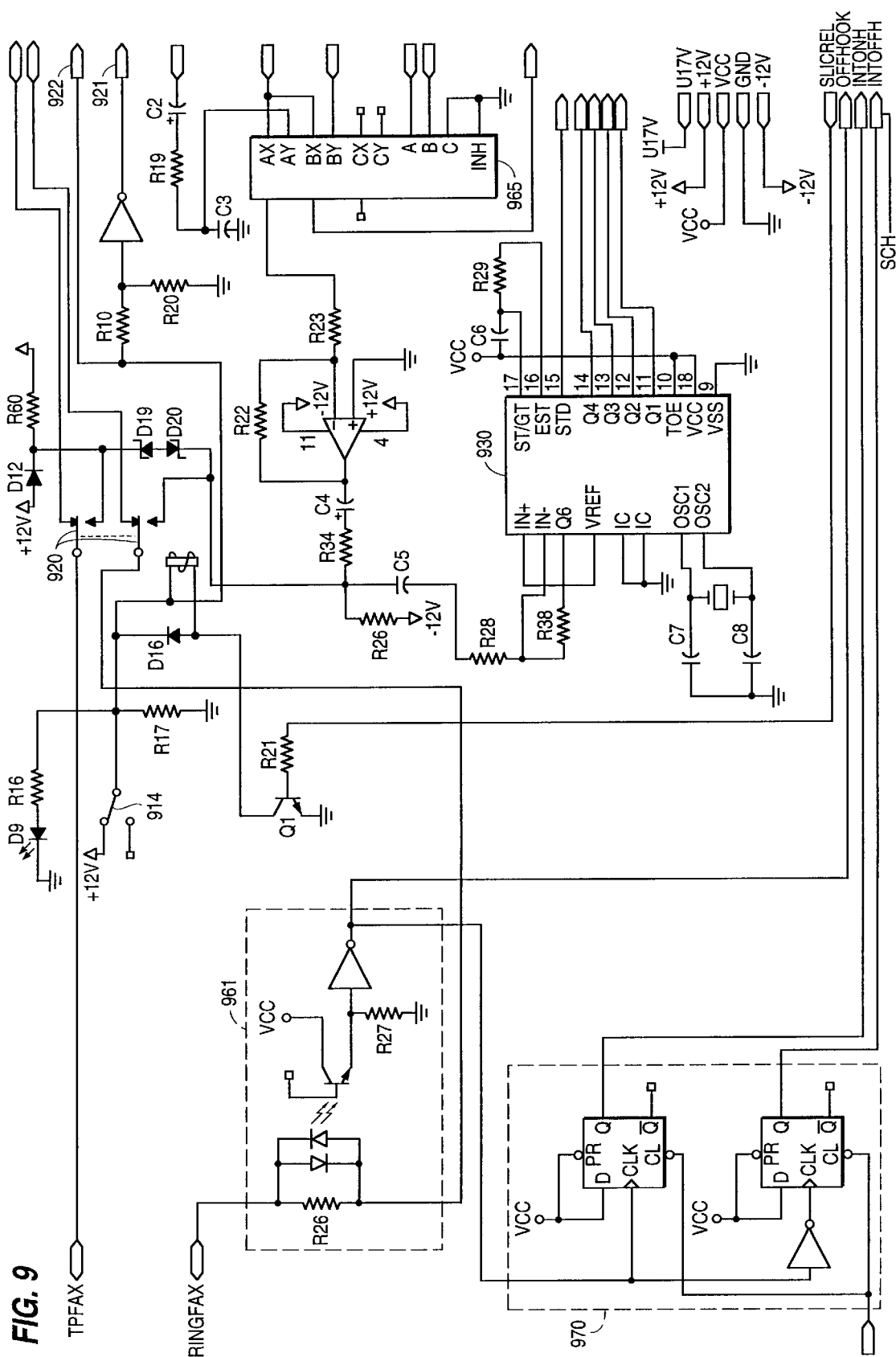
FIG. 9 is a schematic diagram of the facsimile interface block of the facsimile jack according to the invention.

FIG. 9 illustrates a bypass switch 914, which determines whether the power supply to relays 920 and relays 1040 (see FIG. 10) will be cut off. If the bypass switch 914 is opened, the relays 920 and 1040 become de-energized and signals are transmitted between the attached facsimile machine 10 and the telephone line 20 through the FaxJack™ 100. In this case, the function of the FaxJack™ 100 is limited to its snooping function. All other functions are bypassed. The bypass switch 914 is manually switched by the user of the FaxJack™ 100 and the bypass signal (FJBYPASS) 921 is transmitted to the processor 810.

FIG. 9 also illustrates the DTMF transceiver 930 having a color crystal oscillator of 3.579545 Mhz, an off-hook detect circuit 961, and an integrated circuit (IC) 965 which functions as the input selector 122. Box 970 corresponds to an interrupt circuit which supplies to the processor 810 an interrupt signal every time the phone goes off hook (INTOFFH) and comes on hook (INTONH), i.e., each time the status of the phone line changes.

The line interface block 640 includes the DAA 140, the DAA relay 141, the modem 135, the modem Rx selector 134, and the sniffer 136. The schematic details of the telephone line interface block 640 are illustrated in FIG. 10.

FIG. 10 illustrates an IC 1010 which contains the modem 135 and the modem Rx selector 134, a sniffer circuit 1020, a ring detect circuit 1030, and the relays 1040. The relays 1040 are energized in response to power supplied from the fax interface block 620 through signal line RELAYVCC 922 supplied from the fax interface block 620. In their unpowered states, the relays 1040 allow information to pass between signal lines TIPINT 1011 and TIPPOP 1021 and between signal lines RINGINT 1012 and RINGPOP 1022.

The DAA 140 includes the operational amplifier (op amp) 1041 and 1042 shown in FIG. 10. The modem transmits through the op amp 1041 to a transformer 1043. The op amp 1042, on the other hand, blocks the signal from going through using its common mode rejection. Thus, whatever comes in through the transformer 1043 is amplified by the op amp 1042 before being transmitted as a dial tone (DILTONDAA) 1044. Zener diodes 1051 and 1052 which are provided in parallel with the transformer 1043 protect the transformer from spikes to ensure that the line does not get above 12 volts peak-to-peak.

The remaining portions of FIG. 10 corresponds to either to the DAA 140, the DAA relay 141, and the control lines associated with the telephone line interface block 620.

The FaxJack™ 100 also indicates to the user basic diagnostic information through the use of two sets of LED'S. The LED's are placed on the FaxJack™ 100 to be visible to the user.

The first set of diagnostic indicators includes two LED's which are preferably green in color when illuminated. One LED is connected directly to the incoming power and indicates that the FaxJack™ 100 has power. The other LED is illuminated when a facsimile transmission is being directed either through the network or alternative service.

The second set of diagnostic indicators includes three LED's which are preferably red and used to indicate error status. FIG. 6 shows the error status designations. The following is a description of each of the status codes.

OK—indicates the FaxJack™ 100 has been setup correctly and is functioning normally.

Hardware error—indicates the FaxJack™ 100 has a hardware error and needs service.

$E^2$ROM Checksum Error—indicates the $E^2$ROM has a checksum error and needs to be reprogrammed.

Software Softload Checksum Error—indicates that the section of software that is software downloadable has a checksum error and needs to be reprogrammed.

Reserved—indicates LED display sequence that is not currently used.

Local Control Mode—indicates that the FaxJack™ 100 has entered local control mode.

Not Set-Up—indicates that the FaxJack™ 100 has not been successfully setup and is not functional.

To allow for initial setup of the FaxJack™ 100 and to facilitate debug and diagnostics, the FaxJack™ 100 may be controlled locally at the customer site by an operator or a technician. This mode of access is called the local control mode (LCM).

The LCM is entered through the use of a DTMF sequence that is not used for normal telephone dialing. The DTMF digits can either be entered by attaching a telephone handset to the facsimile line or by utilizing a special facsimile machine connected to the facsimile line which is capable of generating the appropriate tones.

Other details of the FaxJack™ 100, in particular its control software is described in the related application entitled "METHOD OF ROUTING A DATA TRANSMISSION."

While particular embodiments according to the invention have been illustrated and described above, it will be clear that the invention can take a variety of forms and embodiments within the scope of the appended claims.

What is claimed is:

1. A facsimile module for selectively routing a facsimile transmission over a packet switched digital network, said facsimile module comprising:

a processor which determines if a destination number of said facsimile transmission is serviceable by said packet switched digital network, said facsimile module being interposed between a facsimile machine and a telephone jack, and a memory which stores therein prefix information corresponding to prefixes of facsimile numbers which are serviceable by said facsimile network, wherein, in a first case where said destination number is serviceable by said packet switched digital network and said facsimile transmission is currently capable of being sent over said packet switched digital network, said facsimile transmission is sent through said packet switched digital network, wherein, in a second case where said destination number is not serviceable by said packet switched digital network and is not currently capable of being sent over said packet switched digital network, said facsimile transmission is sent through a public switched telephone network, wherein said memory further stores therein operation information related to operation of the facsimile module, and wherein at least one of the prefix information and the operation information is downloaded to the facsimile module incrementally during a setup period of the facsimile transmission.

2. A facsimile module as recited in claim 1, wherein said packet switched digital network has a source point of presence which is accessible via a local telephone number to a facsimile machine sending said facsimile transmission and a destination point of presence which is accessible via a local telephone number to a facsimile machine receiving said facsimile transmission, and wherein said source point of presence downloads said at least one of the prefix information and the operation information to said facsimile module during the setup period.

3. A facsimile module as recited in claim 2, wherein (a) if said destination number is long distance and is serviceable by said packet switched digital network, said processor instructs a local number of said source point of presence to be dialed and said facsimile transmission to be sent through said source point of presence, (b) if said destination number is not serviceable by said packet switched digital network, said processor instructs said facsimile transmission to be sent through said public switched telephone network.

4. A facsimile module as recited in claim 3, further comprising a dual tone multifrequency transceiver which detects dial tones associated with said destination number, converts said dial tones into binary form, and provides said dial tones in binary form to said processor.

5. A facsimile module as recited in claim 3, further comprising a digital signal processor which detects dial tones associated with said destination number, converts said dial tones into binary form, and provides said dial tones in binary form to said processor.

6. A facsimile module as recited in claim 5, further comprising:

a memory which stores therein prefixes of facsimile numbers which are serviceable by said facsimile network and the local number of said source point of presence; and a switching mechanism which blocks transmission of dial tones from said facsimile machine to said telephone jack.

7. A facsimile jack, connectable between a facsimile machine and a telephone jack, comprising:

a subscriber line interface relay interfacing with said facsimile machine;

a direct access arrangement relay interfacing with said telephone jack;

a processor which monitors a destination number dialed by said facsimile machine and determines whether or not said destination number is serviceable by said facsimile jack before setting a direct connection between said subscriber line interface relay and said direct access arrangement relay; and a memory accessed by said processor, said memory containing prefix information corresponding to prefixes of destination numbers serviceable by a packet switched digital network accessed using said facsimile jack, said memory also containing operation information related to operation of said facsimile jack, wherein at least one of the prefix information and the operation information is incrementally received through the direct access arrangement relay to the facsimile jack during a setup period of the facsimile transmission.

8. A facsimile jack as recited in claim 7, further comprising:
a subscriber line interface circuit connected between said subscriber line interface relay and said processor; and
a direct access arrangement circuit connected between said direct access arrangement relay and said processor.

9. A facsimile jack as recited in claim 8, further comprising a digital signal processor, connected to said interface circuit, which receives dialing tones associated with said destination number from said facsimile machine through said subscriber line interface circuit, converts said dialing tones into digital form, and provides said dialing tones in digital form to said processor.

10. A facsimile jack as recited in claim 9, wherein said packet switched digital network has a source point of presence which is local to a facsimile machine sending said facsimile transmission and a destination point of presence which is local to a facsimile machine receiving said facsimile transmission, and
wherein said source point of presence downloads said at least one of the prefix information and the operation information to the facsimile jack during the setup period.

11. A facsimile jack as recited in claim 8, further comprising a dual tone multifrequency transceiver, connected to said interface circuit, which receives dialing tones associated with said destination number from said facsimile machine through said subscriber line interface circuit, converts said dialing tones into digital form and provides said dialing tones in digital form to said processor.

12. A method of selectively routing a facsimile transmission through a packet switched digital network including a source point of presence which is local to a first facsimile machine sending said facsimile transmission and a destination point of presence which is local to a second facsimile machine receiving said facsimile transmission, said method comprising the steps of:
dialing a destination number for said facsimile transmission;
determining whether said dialing tones have a prefix associated with said packet switched digital network, and if so, dialing a local number of said source point of presence;
if the determining step makes a determination that said dialing tones have a prefix that is associated with said packet switched digital network but said fax transmission is not capable of being sent over said packet switched digital network, setting up said facsimile transmission over a public switched telephone network, and if said determining step makes a determination that said dialing tones have a prefix that is not associated said packet switched digital network, setting up said facsimile transmission over said public switched telephone network,
wherein the steps of intercepting, determining, and dialing the local number are performed by a facsimile jack connectable between a facsimile machine and a telephone jack, said method further comprising the steps of:
detecting a hardware error in said facsimile jack, said hardware error being an error internal to said facsimile jack; and
if the hardware error is detected, dialing said destination number irrespective of the determining step.

13. A method of selectively routing a facsimile transmission through a packet switched digital network including a source point of presence which is local to a first facsimile machine sending said facsimile transmission and a destination point of presence which is local to a second facsimile machine receiving said facsimile transmission, said method comprising the steps of:
dialing a destination number for said facsimile transmission;
determining whether said dialing tones have a prefix associated with said packet switched digital network, and if so, dialing a local number of said source point of presence;
if the determining step makes a determination that said dialing tones have a prefix that is associated with said packet switched digital network but said fax transmission is not capable of being sent over said packet switched digital network, setting up said facsimile transmission over a public switched telephone network, and if said determining step makes a determination that said dialing tones have a prefix that is not associated said packet switched digital network, setting up said facsimile transmission over said public switched telephone network,
wherein a private network is dialed if said dialing tones have a prefix which is not associated with said packet switched digital network or if said source point of presence is busy, and
wherein, if said private network is busy, said second facsimile machine is dialed directly over said public switched telephone network.

14. A method of selectively routing a facsimile transmission through a packet switched digital network including a source point of presence which is local to a first facsimile machine sending said facsimile transmission and a destination point of presence which is local to a second facsimile machine receiving said facsimile transmission, said method comprising the steps of:
dialing a destination number for said facsimile transmission;
determining whether said dialing tones have a prefix associated with said packet switched digital network, and if so, dialing a local number of said source point of presence;
if the determining step makes a determination that said dialing tones have a prefix that is associated with said packet switched digital network but said fax transmission is not capable of being sent over said packet switched digital network, setting up said facsimile transmission over a public switched telephone network, and if said determining step makes a determination that said dialing tones have a prefix that is not associated said packet switched digital network, setting up said facsimile transmission over said public switched telephone network,
wherein, if after said dialing, said source point of presence is busy, dialing a private network to attempt to set up said facsimile transmission over a private network prior to attempting to set up said facsimile transmission over said public switched telephone network.

15. A method of selectively routing a facsimile transmission through a packet switched digital network including a source point of presence which is local to a first facsimile machine sending said facsimile transmission and a destination point of presence which is local to a second facsimile machine receiving said facsimile transmission, said method comprising the steps of:

dialing a destination number for said facsimile transmission;

determining whether said dialing tones have a prefix associated with said packet switched digital network, and if so, dialing a local number of said source point of presence;

if the determining step makes a determination that said dialing tones have a prefix that is associated with said packet switched digital network but said fax transmission is not capable of being sent over said packet switched digital network, setting up said facsimile transmission over a public switched telephone network, and if said determining step makes a determination that said dialing tones have a prefix that is not associated said packet switched digital network, setting up said facsimile transmission over said public switched telephone network; and bypassing the step of determining in accordance with a user-activated signal.

16. A facsimile module for selectively routing a facsimile transmission over a packet switched digital network, said facsimile module comprising a processor which determines if a destination number of said facsimile transmission is serviceable by said packet switched digital network, said facsimile module being interposed between a facsimile machine and a telephone jack, wherein, in a first case where said destination number is serviceable by said packet switched digital network and said facsimile transmission is currently capable of being sent over said packet switched digital network, said facsimile transmission is sent through said packet switched digital network, wherein, in a second case where said destination number is not serviceable by said packet switched digital network and is not currently capable of being sent over said packet switched digital network, said facsimile transmission is sent through a public switched telephone network, wherein, if said facsimile transmission is not capable of being sent over said packet switched digital network, a determination is made as to whether said facsimile transmission is capable of being sent over a private network, the determination being made prior to attempting to send said facsimile transmission over said public switched telephone network, and wherein said private network is different from said packet switched digital network and from said public switched telephone network.

17. A method of selectively routing a facsimile transmission through a packet switched digital network including a source point of presence which is local to a first facsimile machine sending said facsimile transmission and a destination point of presence which is local to a second facsimile machine receiving said facsimile transmission, said method comprising the steps of:

dialing a destination number for said facsimile transmission;

determining whether said dialing tones have a prefix associated with said packet switched digital network, and if so, dialing a local number of said source point of presence;

if the determining step makes a determination that said dialing tones have a prefix that is associated with said packet switched digital network but said fax transmission is not capable of being sent over said packet switched digital network, setting up said facsimile transmission over a public switched telephone network, and if said determining step makes a determination that said dialing tones have a prefix that is not associated said packet switched digital network, setting up said facsimile transmission over said public switched telephone network, wherein, if the determining step makes a determination that said dialing tones have a prefix that is not associated with said packet switched digital network, making another determination as to whether said dialing tones have a prefix that is associated with a private network separate from said packet switched digital network and from said public switched telephone network, and if said prefix is associated with said private network, setting up said facsimile transmission over said private network and not over said public switched telephone network.

* * * * *